(12) United States Patent
Park

(10) Patent No.: US 11,754,009 B2
(45) Date of Patent: Sep. 12, 2023

(54) METHOD AND SYSTEM FOR CONTROLLING EGR DEVICE IN HIGH-LOAD DRIVING, AND INTERNAL COMBUSTION ENGINE VEHICLE INCLUDING THE SYSTEM

(71) Applicant: HYUNDAI KEFICO CORPORATION, Gyeonggi-do (KR)

(72) Inventor: Ju-Hyun Park, Gyeonggi-do (KR)

(73) Assignee: Hyundai Kefico Corporation, Gyeonggi-Do (KR)

( * ) Notice: Subject to any disclaimer, the term of this patent is extended or adjusted under 35 U.S.C. 154(b) by 0 days.

(21) Appl. No.: 17/706,876

(22) Filed: Mar. 29, 2022

(65) Prior Publication Data

US 2022/0307435 A1    Sep. 29, 2022

(30) Foreign Application Priority Data

Mar. 29, 2021    (KR) .................. 10-2021-0040741

(51) Int. Cl.
*F02D 41/00*    (2006.01)
*F02M 26/49*    (2016.01)

(52) U.S. Cl.
CPC ..... *F02D 41/0052* (2013.01); *F02D 41/0002* (2013.01); *F02D 41/0077* (2013.01); *F02M 26/49* (2016.02); *F02D 2200/0406* (2013.01); *F02D 2200/1002* (2013.01)

(58) Field of Classification Search
CPC .......... F02M 2026/003; F02D 41/0002; F02D 41/0077; F02D 41/0052
See application file for complete search history.

(56) References Cited

U.S. PATENT DOCUMENTS

| 6,397,814 B1* | 6/2002 | Nagaishi ............... F02D 11/105 |
| | | 123/348 |
| 11,542,896 B2* | 1/2023 | Dudar ................ F02M 25/0836 |
| 2017/0130661 A1* | 5/2017 | Nakamura .......... F02D 41/0052 |
| 2017/0350326 A1* | 12/2017 | Shibaike ............... F02P 5/1502 |
| 2020/0132002 A1* | 4/2020 | Wanibe ..................... F02D 9/02 |

(Continued)

FOREIGN PATENT DOCUMENTS

| JP | H 07-317606 A | 12/1995 |
| JP | H 11-280521 A | 10/1999 |

(Continued)

*Primary Examiner* — Logan M Kraft
*Assistant Examiner* — Anthony L Bacon
(74) *Attorney, Agent, or Firm* — Fox Rothschild LLP

(57) ABSTRACT

Proposed is a method and system for controlling an Exhaust Gas Recirculation (EGR) device in high-load driving, and an internal combustion engine vehicle including the system. The method of controlling an EGR device in high-load driving compares a ratio of pressures at a front end and a rear end of a throttle valve with a preset critical value that is a reference for determining high-load driving, performs Wide Open Throttle (WOT) control for fully opening the throttle valve when the ratio of pressures is larger than the preset critical value, determines whether engine torque due to the WOT control and use of EGR satisfies torque requested by a driver, and corrects throttle opening or stops use of EGR, depending on whether the engine torque due to use of EGR together with the WOT control satisfies the requested torque.

11 Claims, 3 Drawing Sheets

(56) References Cited

U.S. PATENT DOCUMENTS

2022/0018294 A1* 1/2022 Garwon .............. F02D 41/1401
2022/0307442 A1* 9/2022 Oda .................... F02D 41/3041

FOREIGN PATENT DOCUMENTS

| JP | 2014-015922 A | 1/2014 |
| JP | 2019-015257 A | 1/2019 |
| KR | 2018-0113654 A | 10/2018 |
| WO | 2012/081111 A1 | 6/2012 |

* cited by examiner

METHOD AND SYSTEM FOR CONTROLLING EGR DEVICE IN HIGH-LOAD DRIVING, AND INTERNAL COMBUSTION ENGINE VEHICLE INCLUDING THE SYSTEM

CROSS REFERENCE TO RELATED APPLICATION

The present application claims priority to Korean Patent Application No. 10-2021-0040741, filed Mar. 29, 2021, the entire contents of which is incorporated herein for all purposes by this reference.

BACKGROUND

1. Field

The present disclosure relates to a method and system for controlling an Exhaust Gas Recirculation (EGR) device in high-load driving and, particularly, to a method and system for controlling an exhaust gas recirculation device in high-load driving, and an internal combustion engine vehicle including the system. The method and device enable exhaust gas recirculation in a high-load driving period using a pressure ratio between the front end and the rear end of a throttle valve by strategically controlling the throttle valve and an EGR valve.

2. Background

Nitrogen oxides (NOx) are environmentally noxious substances that are produced by coupling of oxygen and nitrogen in in-cylinder environmental conditions (e.g., a high-pressure and high-temperature environment). A technology of reducing production of nitrogen oxides by decreasing highest combustion temperature and oxygen saturation by returning some of exhaust gas, which is discharged to the atmosphere, to an intake system in order to suppress nitrogen oxides is generally called an Exhaust Gas Recirculation (EGR) system.

The amount of exhaust gas that is returned to an intake system by an EGR system determines the combustion state of fuel in a combustion chamber and has very important influence on discharge of nitrogen oxides (NOx) and particle matter (PM). Accordingly, it may be very important in EGR to control the amount of exhaust gas that is returned to the intake system of an engine.

Meanwhile, engine torque is proportioned to the amount of intake air and is derived by reflecting an ignition angle, an air-fuel ratio efficiency, etc. as main factors. Accordingly, it is required first to increase the amount of intake air in order to increase engine torque in response to a request for increasing engine torque and it is required to increase the amount of opening of a throttle in order to increase the amount of intake air. That is, it is required to open a throttle valve to that extent.

However, the amount of opening of a throttle is increased (a throttle valve is opened much), a low-pressure difference state, in which the pressure difference between the front end (a position where air is input) and the rear end (a position connected with an intake manifold) of the throttle valve greatly decreases, is made. When EGR is used in this state, EGR gas urges a pressure increase in the intake manifold, so the amount of intake air decreases and a controller further increase the amount of opening of the throttle to compensate for the reduced amount of air.

When the amount of opening of the throttle is further increased in this way, the pressure difference between the front and rear end of the EGR valve also increases, so the recirculation amount of EGR gas decreases. Accordingly, since the controller further opens the EGR valve to achieve a target EGR rate, the pressure in the intake manifold further increases, and thus, air is not sufficiently secured up to the target amount. Therefore, the controller repeats a vicious circle of control that further increases the amount of opening of the throttle.

When the throttle reaches a Wide Open Throttle (WOT) period due to the vicious circle of control, the difference in flow rate of the intake air becomes severe, so the engine output becomes unstable. Accordingly, in the related art, the intake efficiency is increased by stopping use of EGR and controlling a valve opening/closing timing in the WOT period, that is, the high-load driving period, and fuel injection is made rich to secure strength against knocking in combustion.

However, when use of EGR is stopped and fuel injection is made rich, the discharge amount of nitrogen oxides is correspondingly increased and there is limitation in satisfying a CO discharge amount and the theoretical air-fuel ratio operation in entire period regulated by EU 7.

SUMMARY

In one aspect, a method and system is provided for controlling an EGR device in high-load driving, the method and system being able to determine whether torque requested by a driver can be achieved through EGR gas inflow by comparing a torque loss due to a loss of the amount of intake air by EGR gas inflow with a torque gain due to ignition efficiency improvement by EGR gas inflow, and being able to improve the performance of reducing nitrogen oxides and exhaust gas by using EGR even in a high-load period when the torque requested by a driver can be achieved, and an internal combustion engine vehicle including the system.

According to an aspect of the present disclosure, there is provided a method of controlling an Exhaust Gas Recirculation (EGR) device in high-load driving, the method including:

(a) a step of comparing a ratio of pressures at a front end and a rear end of a throttle valve with a preset critical value that is a reference for determining high-load driving;

(b) a step of performing Wide Open Throttle (WOT) control for fully opening the throttle valve when the ratio of pressures is larger than the preset critical value;

(c) a step of determining whether engine torque due to the WOT control and use of EGR satisfies torque requested by a driver; and (d) a step of correcting throttle opening or stopping use of EGR, depending on whether the engine torque due to use of EGR together with the WOT control satisfies the requested torque. One or more the above steps (a) through (d) may be carried out through use of a processor or control unit.

A process may be set to control the throttle valve (throttle normal control) such that a throttle opening amount is adjusted to correspond to a target air amount for achieving the requested torque using an intake map having torque as a factor when the ratio of pressure is the preset critical value or less as the result of comparison in the step (a).

In certain aspects, in the above step (c), whether the requested torque is satisfied may be determined by comparing a torque loss due to a loss of intake air amount by inflow of EGR gas with a torque gain due to improvement of ignition efficiency by inflow of EGR gas.

It may be determined that the requested torque is not satisfied when the torque loss due to a loss of intake air amount by inflow of EGR gas is larger than the torque gain due to improvement of ignition efficiency by inflow of EGR gas, and it may be determined that the requested torque is satisfied when the torque gain due to improvement of ignition efficiency by inflow of EGR gas is larger than the torque loss due to a loss of intake air amount by inflow of EGR gas.

In certain aspects, in the above step (d), when engine torque due to use of EGR together with WOT satisfies the requested torque, inflow of EGR gas may be made easy through throttle feedback control that reduces throttle opening, and when the engine torque due to use of EGR together with WOT does not satisfy the requested torque, use of EGR may be stopped.

In the throttle feedback control, a throttle opening amount may be controlled through PI control that uses map data obtained by mapping gains for air amount errors (target air amount—actual air amount) due to use of EGR.

In order to achieve the objectives, according to another aspect of the present disclosure, there is provided a system for controlling an Exhaust Gas Recirculation (EGR) device in high-load driving, the system including:

a throttle controller configured to adjust the amount of intake air by controlling an electronic throttle valve installed in an intake line;

an EGR controller configured to adjust an EGR amount (the amount of returned exhaust gas) by controlling an electronic EGR valve installed in an EGR line connecting an exhaust line and the intake line to each other; and an integrated controller configured to output a control instruction to the throttle controller and the EGR controller, in which the integrated controller outputs a Wide Open Throttle (WOT) instruction for fully opening the throttle valve to the throttle controller when a ratio of pressures at front and rear ends of the throttle valve, which are measured by pressure sensors at the front end and the rear end of the throttle valve, is larger than a preset critical value that is a reference for determining high-load driving, and determines whether engine torque due to WOT control and use of EGR satisfies torque requested by a driver and outputs a throttle opening correction instruction to the throttle controller or outputs an instruction that stops use of EGR to the EGR controller, depending on whether the requested torque is satisfied.

In certain aspects, when the ratio of pressures is the preset critical value or less, the throttle controller may control the throttle valve (throttle normal control) in response to an instruction from the integrated controller such that a throttle opening amount is adjusted to correspond to a target air amount for achieving the requested torque using an intake map having torque as a factor.

The integrated controller may determine whether the requested torque is satisfied by comparing a torque loss due to a loss of intake air amount by inflow of EGR gas with a torque gain due to improvement of ignition efficiency by inflow of EGR gas.

The integrated controller may determine that the requested torque is not satisfied when the torque loss due to a loss of intake air amount by inflow of EGR gas is larger than the torque gain due to improvement of ignition efficiency by inflow of EGR gas, and may determine that the requested torque is satisfied when the torque gain due to improvement of ignition efficiency by inflow of EGR gas is larger than the torque loss due to a loss of intake air amount by inflow of EGR gas.

The integrated controller may output a throttle opening correction instruction that reduces throttle opening to the throttle controller when engine torque due to use of EGR together with WOT control satisfies the requested torque, and may output an instruction that stops use of EGR to the EGR controller when the engine torque due to use of EGR together with WOT control does not satisfy the requested torque.

The throttle controller receiving the throttle opening correction instruction from the integrated controller may control a throttle opening amount through PI control that uses map data obtained by mapping gains for air amount errors (target air amount—actual air amount) due to use of EGR.

In order to achieve the objectives, according to another aspect of the present disclosure, there is provided an internal combustion engine vehicle comprising the system for controlling an EGR device in high-load driving described above.

According to an embodiment of the present disclosure, whether torque requested by a driver can be achieved through inflow of EGR gas is determined by comparing a torque loss due to a loss of intake air amount by inflow of EGR gas and a torque gain due to improvement of ignition efficiency by inflow of EGR gas with each other, and if so, the performance of reducing nitrogen oxides and exhaust gas can be improved by using EGR even in a high-load period.

Further provided are vehicles that comprise apparatus and/or methods as disclosed herein, including a passenger vehicle, truck or other vehicle.

As referred to herein, high-load driving includes for example low-speed slope climbing.

BRIEF DESCRIPTION OF THE DRAWINGS

The above and other objectives, features and other advantages of the present invention will be more clearly understood from the following detailed description when taken in conjunction with the accompanying drawings, in which.

DETAILED DESCRIPTION

Figure 1:
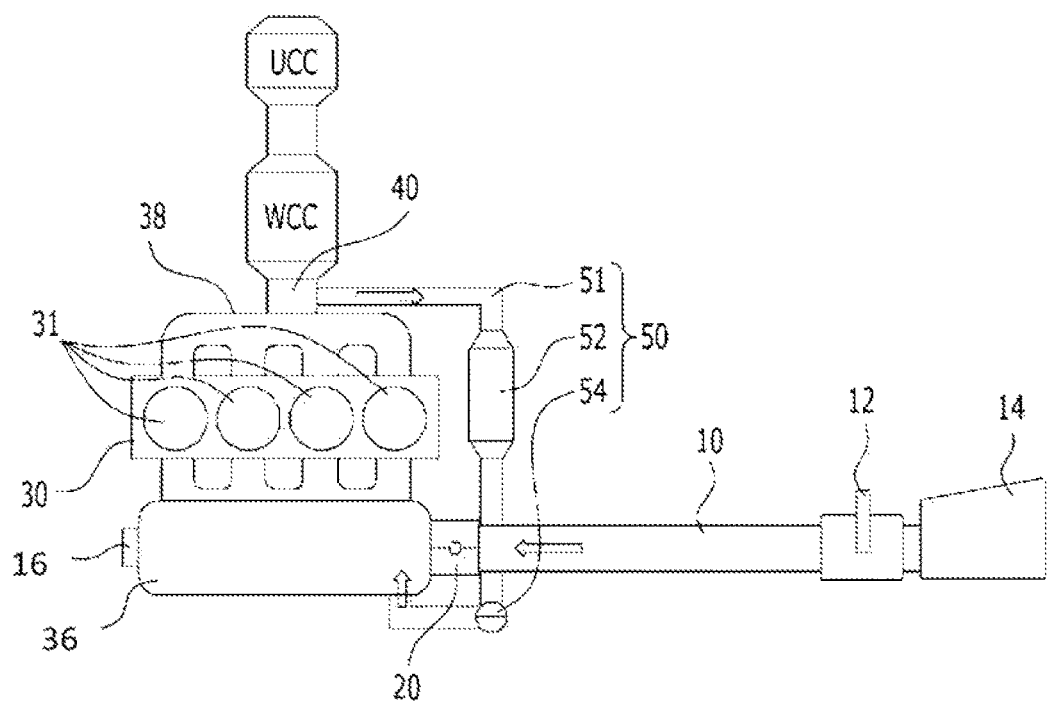
FIG. 1 is a view schematically showing the main configuration of an internal combustion engine vehicle including an EGR device related to an embodiment of the present disclosure.

Hereinafter, exemplary embodiments of the present disclosure are described in detail with reference to the drawings.

The terminology used herein is for the purpose of describing particular embodiments only and is not intended to limit the present disclosure. Singular forms are intended to include plural forms unless the context clearly indicates otherwise.

It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements.

Terms used in the specification, "first", "second", etc., may be used to describe various components, but the components are not to be construed as being limited to the terms. The terms are used only to distinguish one component from another component.

Terms "~er", "~unit", "~module", etc. used herein mean the units for processing at least one function or operation and may be implemented by hardware, software, or a combination of hardware and software.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example, both gasoline-powered and electric-powered vehicles.

In the following description referring to the accompanying drawings, the same components are given the same reference numerals and are not repeatedly described. However, in describing the present disclosure, detailed descriptions of well-known technologies will be omitted so as not to obscure the description of the present disclosure with unnecessary detail.

First, the configuration of an exhaust gas recirculation device is described with reference to FIG. 1.

FIG. 1 is a view schematically showing the main configuration of an internal combustion engine vehicle including an exhaust gas recirculation device related to an embodiment of the present disclosure.

Referring to FIG. 1, an internal combustion engine vehicle including an exhaust gas recirculation device includes an engine 30, an intake line 10 through which air (intake air) to be supplied to engine combustion chambers 31 flows, and an exhaust line 40 through which exhaust gas discharged from the combustion chambers 31 flows. Further, the vehicle includes an exhaust gas recirculation 50 (hereafter, referred to as an 'EGR device') installed from the high-pressure side of the exhaust line 40 to an intake manifold 36 to which the intake line 10 is connected.

The engine 30 converts chemical energy into mechanical energy by burning a gas mixture of fuel and air. The engine 30 is connected to the intake manifold 36, so air for combustion flows into the combustion chambers 31 and exhaust gas produced in the combustion process is collected in the exhaust manifold 38 and then discharged to the atmosphere through the exhaust line 40. An injector (not shown) is mounted in each of the combustion chambers 31 and injects fuel into the combustion chambers.

The exhaust line 40 is connected to the exhaust manifold 38 and discharges exhaust gas out of the vehicle. Depending on cases, a turbine of a turbo charger (not shown) that is rotated by the pressure of the exhaust gas flowing through the exhaust line 40 may be disposed in the exhaust line, and a compressor (not shown) that compresses the intake air, which is supplied to the engine combustion chambers 31, while being rotated by torque of the turbine may be disposed in the intake line 10.

The EGR device 50 decreases the combustion temperature by returning some of the exhaust gas flowing through the exhaust line 40 to the intake line 10, and reduces production of nitrogen oxides. The EGR device 50 includes an EGR line 51 connecting the exhaust line 40 and the intake manifold 36 to each other, and an EGR cooler 52 decreasing the temperature of the returning exhaust gas (hereafter, referred to as 'EGR gas') at the middle of the EGR line 51.

An electronic EGR valve 54 that adjusts the amount of EGR gas, which is returned to the intake side, is installed in the EGR line 51 between the EGR cooler 52 and the intake manifold 36, and a pair of pressure difference sensors (not shown) is installed at the front end and the rear end of the EGR valve 54 in the flow direction of the EGR gas. A controller performs feedback control on the EGR valve 54 on the basis of detection information of the pressure difference sensors so that an EGR rate is maintained at a target level.

For reference, the EGR rate is a rate of the amount of exhaust gas recirculated to the intake side by the EGR device to the amount of the entire gas flowing in cylinders and may be stored in a storage medium such as a memory in a matrix type for two factors of the rpm and load of the engine through engine optimization control. That is, it may be stored in a map data type.

In FIG. 1, reference numeral '14' is an air cleaner for filtering out foreign substances contained in intake air and reference numeral '20' is a throttle valve that adjusts the amount of air to be supplied to the engine combustion chambers 31. Further, reference numeral '12' is an air mass flow meter for measuring the flow rate of air ahead of the throttle valve and reference numeral '36' is an MAP sensor for measuring the internal pressure of the intake manifold.

Figure 2:
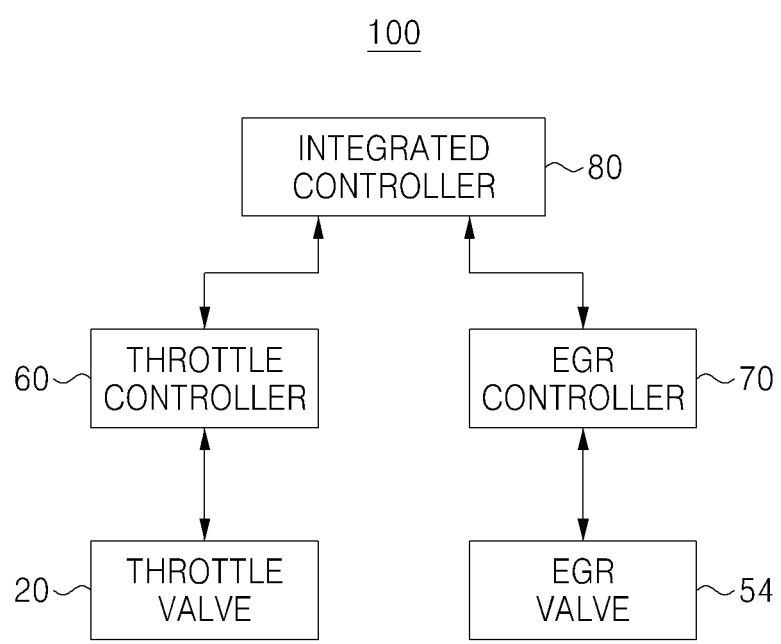
FIG. 2 is a view schematically showing a system configuration of a system for controlling an EGR device in high-load driving according to an embodiment of the present disclosure.

FIG. 2 is a view schematically showing a system configuration of a system for controlling an EGR device in high-load driving according to an embodiment of the present disclosure which is applied to an internal combustion engine vehicle equipped with the EGR device shown in FIG. 1.

Referring to FIG. 2 together with FIG. 1, a system 100 for controlling an EGR device in high-load driving according to an embodiment of the present disclosure includes a throttle controller 60 that controls the throttle valve 20 and an EGR controller 70 that controls the EGR valve 54. The system further includes an integrated controller 80, e.g., an Engine Control Unit (ECU), which integrally controls the throttle controller 60 and the EGR controller 70.

The throttle controller 60 adjusts the amount of intake air by controlling the electronic throttle valve 20 installed in the intake line 10. In more detail, the throttle controller 60 adjusts the throttle opening amount of the throttle valve to corresponding to output of an Acceleration Position Sensor (APS) in response to a control instruction of the integrated controller 80 on the basis of detection information of the APS. For example, the throttle opening is increased when the APS output value is larger, and the throttle opening is decreased when the APS output value is small.

The EGR controller 70 adjusts an EGR amount (or an EGR rate) by controlling the electronic EGR valve 54 installed in the EGR line 51 connecting the exhaust line 40 and the intake line 10 to each other. In more detail, the opening amount of the EGR valve 54 is adjusted on the basis of the EGR rate determined through an exclusive map (EGR map) in accordance with an engine state and a control instruction of the integrated controller 80 based on the output of the pressure difference sensors at the front and rear ends.

The integrated controller 80, for example, the ECU determines control values for the throttle valve 20 and the EGR valve 54, for example, on the basis of information that is provided to control the throttle valve 20 and the EGR valve 54 by detection devices installed on the vehicle, for example, the pressure difference sensors, the APS, etc. The determined control values are output at control instructions to the throttle controller 60 and the EGR controller 70 so that target control can be achieved.

The integrated controller 80 according to an embodiment of the present disclosure particularly compares the ratio of pressures at the front end and rear end of the throttle valve 20 measured by the pressure sensors at the front end and the rear end of the throttle valve 20 with a predetermined critical value that is a difference for determining high-load driving. When the ratio of pressures at the front end and rear end of the throttle valve 20 is larger than the predetermined critical value, the integrated controller 80 determines that it is high-load driving, and outputs a Wide Open Throttle (WOT) instruction for fully opening the throttle valve 20 to the throttle controller 60.

The system further includes a processor programmed to determine whether engine torque by using EGR too in WOT control satisfies required-by-driver torque that is determined by an operation amount of an accelerator pedal, a vehicle speed, an engine rpm, load, etc. when the accelerator pedal is operated, and to perform a series of control of outputting a throttle opening correction instruction to the throttle controller 60 or outputting EGR use stop instruction to the EGR controller 70 step by step, depending on whether the above condition is satisfied.

If the ratio of pressures at the front end and rear end of the throttle valve 20 is a predetermined critical value, which is the reference for determining high-load driving, or higher, the integrated controller 80 controls the throttle controller 60 to commonly control the throttle valve 20. The common control of the throttle valve 20 means throttle normal control that adjusts the throttle opening amount in accordance with a target air amount (a target air amount for achieving requested torque) that is determined by an intake map having torque as a factor.

When EGR gas flows into the intake manifold by EGR control in high-load driving, an increase of the pressure of the intake manifold is accelerated, and the difference between the pressure of the intake manifold and the atmospheric pressure becomes low. Accordingly, in a high-load driving period, the amount of intake air that suctioned into the engine decreases and engine torque also decreases as much of the reduction of the amount of intake air. That is, a loss of the amount of intake air is generated and a torque loss Trq.loss is correspondingly generated.

However, in the meantime, a torque gain Trq.gain due to inflow of EGR gas can be expected. Since EGR gas is exhaust gas, so the EGR gas fundamentally includes heat energy. Accordingly, when EGR gas flows inside, the temperature of air that is supplied to the combustion chambers through the intake manifold increases. Further, when the temperature of the air that is supplied to the combustion chambers increases, ignition correspondingly easily occurs, so ignition efficiency is improved.

Accordingly, when determining whether engine torque satisfies torque requested by a driver due to use of EGR in WOT control, the integrated controller 80 applied to the present disclosure determines whether the engine torque satisfies the requested torque by comparing a torque loss Trq.loss due to a loss of the amount of intake air by inflow of EGR gas and a torque gain Trq.gain due to ignition efficiency improvement by inflow of EGR gas with each other.

In detail, when the torque loss Trq.loss due to inflow of EGR gas is larger than the torque gain Trq.gain due to inflow of EGR gas when EGR is used, that is, a loss is larger than a gain due to use of EGR, the integrated controller 80 determines that the torque requested by a driver is not satisfied at present, and can output an instruction to stop use of EGR to the EGR controller 70.

On the contrary, the torque gain Trq.gain due to inflow of EGR gas is larger than the torque loss Trq.loss due to inflow of EGR gas when EGR is used, that is, when a gain due to use of EGR is larger than a loss, it is the situation in which EGR can keep being used, so the integrated controller 80 determines that the torque requested by a driver is satisfied, and can output a throttle opening correction instruction that stabilizes the flow rate of the intake air by decreasing the throttle opening to the throttle controller 60.

In this case, the throttle opening can be corrected by feedback control of the throttle controller 60 with respect to the throttle valve 20 on the basis of information of intake air amount error. In more detail, the throttle opening can be corrected by Proportional Integrate (PI) control of the throttle controller 60 that uses data obtained by mapping gains for intake air amount error (target air amount—actual air amount) due to use of EGR.

A series of processes of controlling an EGR device in high-load driving which is performed by the system for controlling an EGR device in high-load driving according to an embodiment of the present disclosure described above is described with reference to the control flowchart of FIG. 3. For the convenience of description, the components shown in FIG. 1 are described with reference to their reference numerals.

Figure 3:
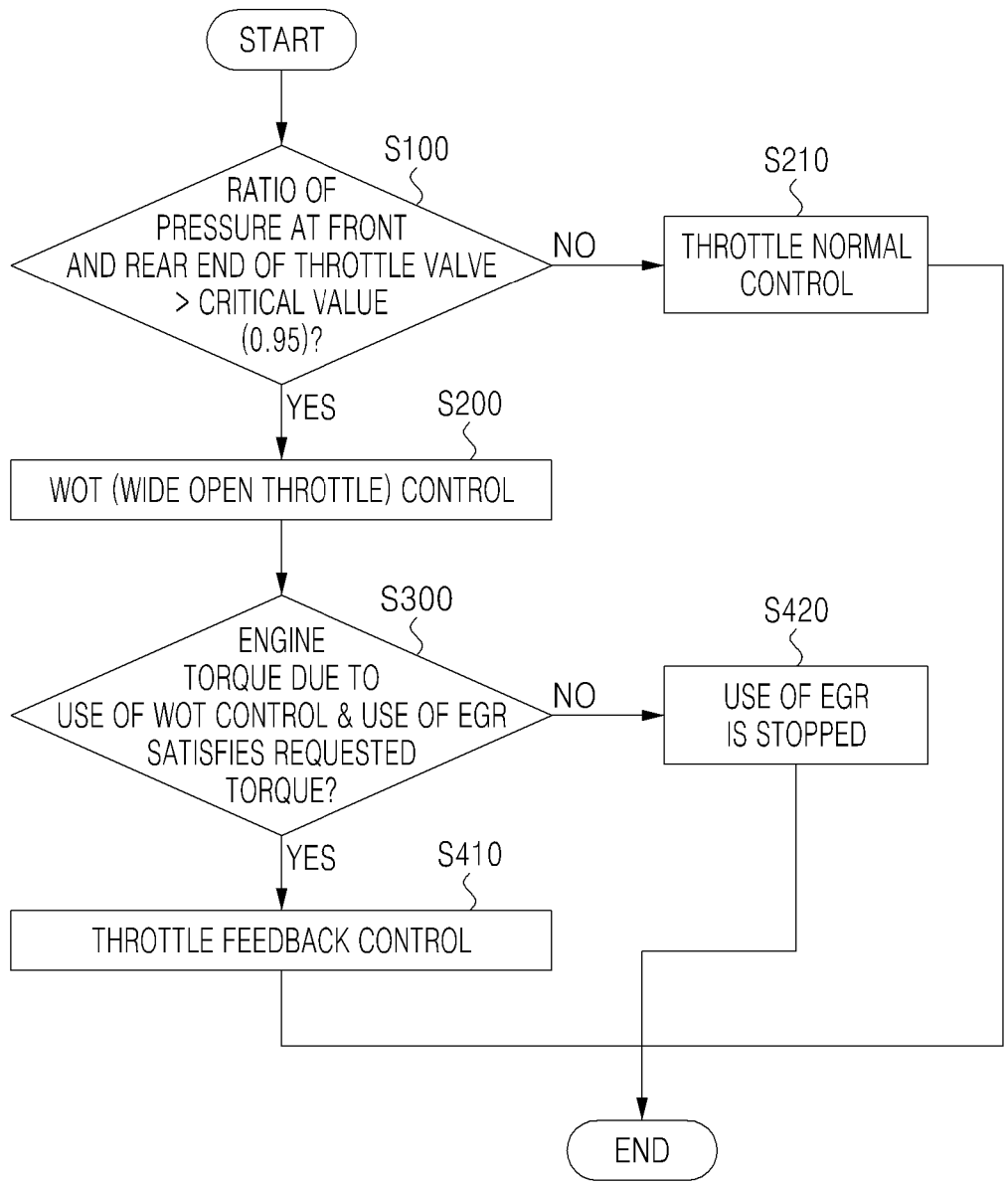
FIG. 3 is a flowchart sequentially showing a series of processes of controlling an EGR device in high-load driving which is performed by the system for controlling an EGR device in high-load driving shown in FIG. 1.

FIG. 3 is a flowchart sequentially showing a series of processes of controlling an EGR device in high-load driving which is performed by the system for controlling an EGR device in high-load driving shown in FIG. 1.

Referring to FIG. 3, the method of controlling an EGR device in high-load driving according to an embodiment of the present disclosure starts with a step of determining whether high-load driving is performed (S100). In step S100, whether it is high-load driving may be determined by comparing the ratio of pressures at the front end and the rear end of the throttle valve 20 with a preset critical value that is the reference for determining high-load driving. The present critical value may be 0.95, but is not limited thereto.

When high-load driving in which the ratio of pressures at the front end and the rear end of the throttle valve 20 is larger than the preset critical value is determined in step S100, the process progresses to a step S200 of performing Wide Open Throttle (WOT) control for fully opening the throttle valve 20. When the ratio is the present critical value or less, the throttle valve 20 is controller (throttle normal control) such that the throttle opening is adjusted to correspond to the target air amount for achieving requested torque using an intake map (S210).

A step S300 of determining whether engine torque due to use of EGR satisfies torque requested by a driver is performed next after WOT control through step S200. Finally, the throttle opening is corrected (S410) or use of EGR is stopped through throttle feedback control, depending on whether the engine torque due to use of EGR together with WOT control satisfies the requested torque (S420).

In step S300, it may be possible to determine whether the requested torque is satisfied by comparing a torque loss Trq.loss due to a loss of intake air amount by inflow of EGR gas with a torque gain Trq.gain due to improvement of ignition efficiency by inflow of EGR gas. The ignition efficiency may be determined on the basis of an exclusive map keeping the relationship between an EGR rate and ignition efficiency (variation of ignition efficiency due to variation of EGR rate) in a table map form.

In step S300, in detail, it may be possible to determine that the requested torque is not satisfied when the torque loss Trq.loss due to inflow of EGR gas is larger than the torque gain Trq.gain due to inflow of EGR gas, and it may be possible to determine that that the requested torque is satisfied when the torque gain Trq.gain due to inflow of EGR gas is larger than the torque loss Trq.loss due to inflow of EGR gas.

When it is determined that engine torque due to use of EGR together with WOT control satisfies a toque value at the level requested by an Engine Management System (EMS) (the requested torque), the flow rate of air is stabilized and inflow of EGR gas is made easy by maintaining an EGR use strategy in a high-load period and performing throttle feedback control that reduces the throttle opening.

Unlikely, it is determined that engine torque due to use of EGR together with WOT control does not satisfy a toque value at the level requested by an Engine Management System (EMS) (the requested torque), use of EGR is stopped and control for maximally securing an intake air amount is performed first (existing WOT throttle control, S420) to avoid the problem of vicious circle of control due to using EGR together.

Meanwhile, in the throttle feedback control for throttle opening correction (correction for reducing throttle opening) in step S410, correction of reducing the throttle opening may be achieved through Proportional Integrate (PI) control of the throttle controller that uses data obtained by mapping gains to intake air amount errors due to use of EGR (target air amount—actual air amount).

When EGR is used in a high-load period, a target intake air amount cannot be sufficiently secured and a controller increases throttle opening. In this case, a condition that is disadvantageous to generation of a pressure difference between the front and rear ends of the EGR valve is made, so a vicious circle of control in which the controller further opens the EGR valve to achieve a target EGR rate is repeated. It is prohibited in the related art to use EGR in a high-load period in order to avoid this problem.

However, in an embodiment of the present disclosure, whether torque requested by a driver can be achieved through inflow of EGR gas is determined by comparing a torque loss Trq.loss due to a loss of intake air amount by inflow of EGR gas and a torque gain Trq.gain due to improvement of ignition efficiency by inflow of EGR gas with each other, and if so, the performance of reducing nitrogen oxides and exhaust gas can be improved by using EGR even in a high-load period.

Only a specific embodiment was described in the above detailed description. The present disclosure should not be construed as being limited to the specific embodiment described above, but should be construed as including all changes, equivalents, and substitutions within the spirit of the present disclosure defined in the claims.

What is claimed is:

1. A method of controlling an Exhaust Gas Recirculation (EGR) device in high-load driving, the method comprising:
   (a) comparing a ratio of pressures at a front end and a rear end of a throttle valve with a preset critical value that is a reference for determining high-load driving;
   (b) performing Wide Open Throttle (WOT) control for fully opening the throttle valve when the ratio of pressures is larger than the preset critical value;
   (c) determining whether engine torque due to the WOT control and use of EGR satisfies torque requested by a driver; and
   (d) correcting throttle opening or stopping use of EGR, depending on whether the engine torque due to use of EGR together with the WOT control satisfies the requested torque,
   wherein, in (c), whether the requested torque is satisfied is determined by comparing a torque loss due to a loss of intake air amount by inflow of EGR gas with a torque gain due to improvement of ignition efficiency by inflow of EGR gas.

2. The method of claim 1, wherein when the ratio of pressure is the preset critical value or less as the result of comparison in (a), the throttle valve is controlled (throttle normal control) such that a throttle opening amount is adjusted to correspond to a target air amount for achieving the requested torque using an intake map having torque as a factor.

3. The method of claim , wherein it is determined that the requested torque is not satisfied when the torque loss due to a loss of intake air amount by inflow of EGR gas is larger than the torque gain due to improvement of ignition efficiency by inflow of EGR gas, and
   it is determined that the requested torque is satisfied when the torque gam due to improvement of ignition efficiency by inflow of EGR gas is larger than the torque loss due to a loss of intake air amount by inflow of EGR gas.

4. The method of claim 1, wherein in (d), when engine torque due to use of EGR together with WOT satisfies the requested torque, inflow of EGR gas is made easy through throttle feedback control that reduces throttle opening, and when the engine torque due to use of EGR together with WOT does not satisfy the requested torque, use of EGR is stopped.

5. The method of claim 4, wherein, in the throttle feedback control, a throttle opening amount is controlled through PI control that uses map data obtained by mapping gains for air amount errors (target air amount- actual air amount) due to use of EGR.

6. A system for controlling an Exhaust Gas Recirculation (EGR) device in high-load driving, the system comprising:

a throttle controller configured to adjust the amount of intake air by controlling an electronic throttle valve installed in an intake line;

an EGR controller configured to adjust an EGR amount (the amount of returned exhaust gas) by controlling an electronic EGR valve installed in an EGR line connecting an exhaust line and the intake line to each other; and an integrated controller configured to output a control instruction to the throttle controller and the EGR controller, wherein the integrated controller outputs a Wide Open Throttle (WOT) instruction for fully opening the throttle valve to the throttle controller when a ratio of pressures at front and rear ends of the throttle valve, which are measured by pressure sensors at the front end and the rear end of the throttle valve, is larger than a preset critical value that is a reference for determining high-load driving, and determines whether engine torque due to WOT control and use of EGR satisfies torque requested by a driver and outputs a throttle opening correction instruction to the throttle controller or outputs an instruction that stops use of EGR to the EGR controller, depending on whether the requested torque is satisfied;

wherein the integrated controller determines whether the requested torque is satisfied by comparing a torque loss due to a loss of intake air amount by inflow of EGR gas with a torque gain due to improvement of ignition efficiency by inflow of EGR gas.

7. The system of claim 6, wherein when the ratio of pressures is the preset critical value or less, the throttle controller controls the throttle valve (throttle normal control) in response to an instruction from the integrated controller such that a throttle opening amount is adjusted to correspond to a target air amount for achieving the requested torque using an intake map having torque as a factor.

8. The system of claim wherein the integrated controller
determines that the requested torque is not satisfied when the torque loss due to a loss of intake air amount by inflow of EGR gas is larger than the torque gain due to improvement of ignition efficiency by inflow of EGR gas, and determines that the requested torque is satisfied when the torque gain due to improvement of ignition efficiency by inflow of EGR gas is larger than the torque loss due to a loss of intake air amount by inflow of EGR gas.

9. The system of claim 6, wherein the integrated controller
outputs a throttle opening correction instruction that reduces throttle opening to the throttle controller when engine torque due to use of EGR together with WOT control satisfies the requested torque, and outputs an instruction that stops use of EGR to the EGR controller when the engine torque due to use of EGR together with WOT control does not satisfy the requested torque.

10. The system of claim 9, wherein the throttle controller receiving the throttle opening correction instruction from the integrated controller controls a throttle opening amount through PI control that uses map data obtained by mapping gains for air amount errors (target air amount -actual air amount) due to use of EGR.

11. An internal combustion engine vehicle comprising the system for controlling an EGR device in high-load driving of claim 6.

* * * * *